US008019218B2

United States Patent
Tanimoto et al.

(10) Patent No.: US 8,019,218 B2
(45) Date of Patent: Sep. 13, 2011

(54) OPTICAL SIGNAL MONITORING APPARATUS AND METHOD

(75) Inventors: Takao Tanimoto, Hadano (JP); Akihito Otani, Atsugi (JP)

(73) Assignee: Anritsu Corporation, Atsugi-Shi (JP)

( * ) Notice: Subject to any disclaimer, the term of this patent is extended or adjusted under 35 U.S.C. 154(b) by 675 days.

(21) Appl. No.: 12/087,476

(22) PCT Filed: Dec. 11, 2007

(86) PCT No.: PCT/JP2007/073878
§ 371 (c)(1),
(2), (4) Date: Jul. 8, 2008

(87) PCT Pub. No.: WO2008/087810
PCT Pub. Date: Jul. 24, 2008

(65) Prior Publication Data
US 2009/0034966 A1    Feb. 5, 2009

(30) Foreign Application Priority Data
Jan. 15, 2007    (JP) ................................. 2007-005762

(51) Int. Cl.
*H04B 17/00* (2006.01)
*H04B 10/08* (2006.01)
(52) U.S. Cl. .......................................... 398/25; 398/33
(58) Field of Classification Search ................ 398/25, 398/33
See application file for complete search history.

(56) References Cited

U.S. PATENT DOCUMENTS
4,961,206 A * 10/1990 Tomlinson et al. ............ 375/261
(Continued)

FOREIGN PATENT DOCUMENTS
JP        6-21891 A    1/1994
(Continued)

OTHER PUBLICATIONS
PCT Notification of Transmittal of Translation of the International Preliminary Report on Patentability (Chapter I or II of the PCT) issued in Appln. No. PCT/JP2007/073878 mailed Jul. 30, 2009.
(Continued)

*Primary Examiner* — Ken N Vanderpuye
*Assistant Examiner* — Abbas Alagheband
(74) *Attorney, Agent, or Firm* — Holtz, Holtz, Goodman & Chick, P.C.

(57) ABSTRACT

An optical signal monitoring apparatus includes an optical interference unit, a sampling optical pulse generation unit, an optical sampling unit, a photoelectric converter, and a computation unit. The optical interference unit includes an optical brancher, a delay device, an optical phase adjuster, and an optical multiplexer. The optical brancher branches a monitoring object signal optical signal phase-modulated at a predetermined symbol rate into two optical paths. The delay device imparts delay corresponding to an integral multiple of one symbol to an optical signal branched in one optical path of the two optical paths. The optical phase adjuster brings an optical signal emitted delay device and an optical signal branched in another optical path of the two optical paths into a predetermined optical phase difference. The optical multiplexer multiplexes the optical signals which are brought into the predetermined optical phase difference, and converts the phase-modulated monitoring object optical signal into intensity-modulated light to emit the intensity-modulated light. The sampling optical pulse generation unit generates a sampling optical pulse having a period which is different from a predetermined offset time to integral multiplication of a symbol clock period corresponding to the predetermined symbol rate. The optical sampling unit samples the intensity-modulated light using the sampling optical pulse and emits an optical pulse signal.

21 Claims, 9 Drawing Sheets

U.S. PATENT DOCUMENTS

| | | | |
|---|---|---|---|
| 6,396,601 B1 * | 5/2002 | Takara et al. | 398/9 |
| 7,848,647 B2 * | 12/2010 | Watanabe | 398/45 |
| 2003/0011837 A1 | 1/2003 | Shake et al. | |
| 2005/0047788 A1 | 3/2005 | Miyazaki | |
| 2006/0051100 A1 * | 3/2006 | Watanabe | 398/152 |

FOREIGN PATENT DOCUMENTS

| | | |
|---|---|---|
| JP | 11-223575 A | 8/1999 |
| JP | 2003-90766 A | 3/2003 |
| JP | 2005-70698 A | 3/2005 |
| JP | 2006-3326 A | 1/2006 |
| JP | 2006-184851 A | 7/2006 |
| JP | 2007-274664 A | 10/2007 |

OTHER PUBLICATIONS

An English language International Search Report dated Mar. 18, 2008, issued in a counterpart International Application.

* cited by examiner

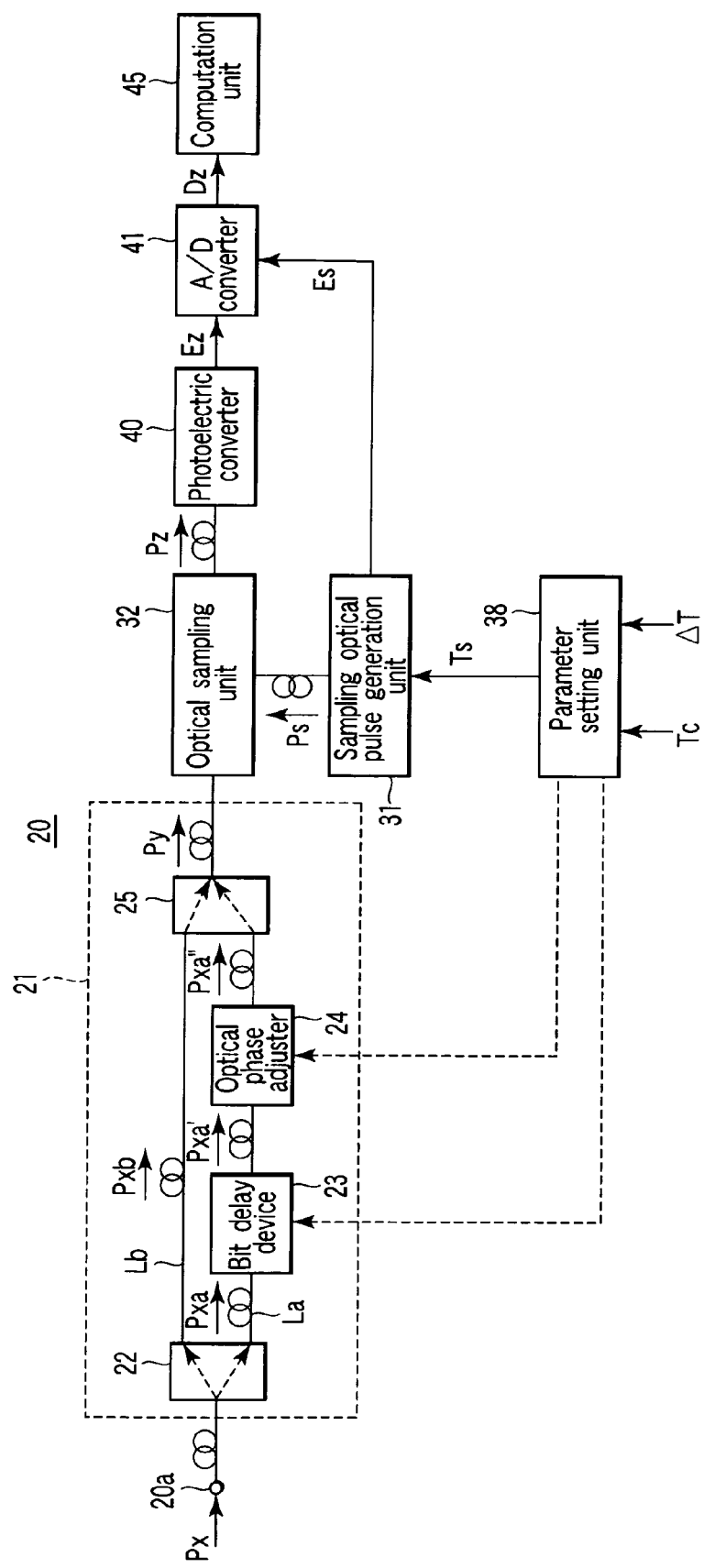
F I G. 1

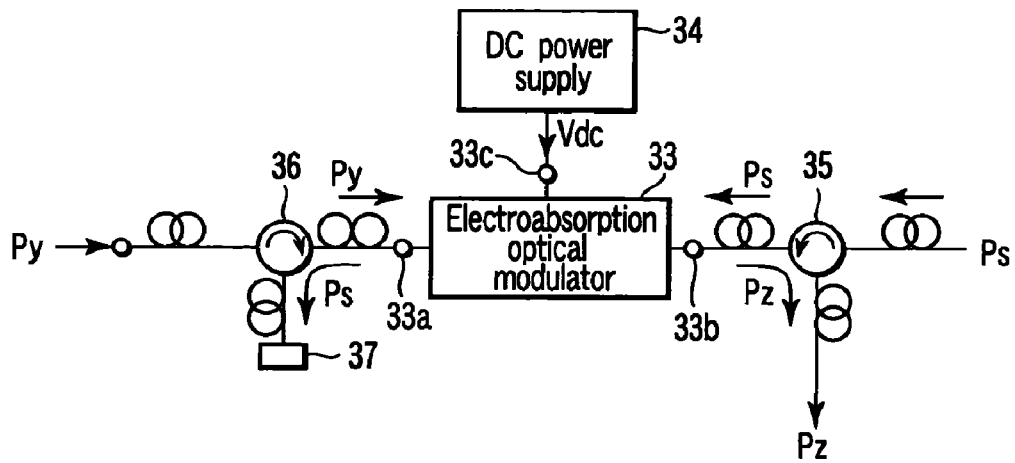
F I G. 4
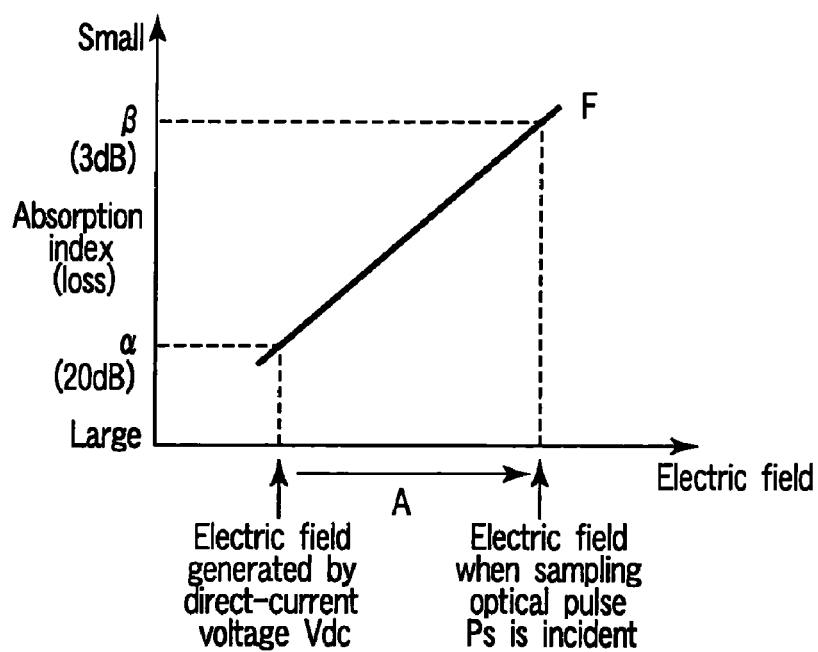
F I G. 5

OPTICAL SIGNAL MONITORING APPARATUS AND METHOD

This application is a U.S. National Phase Application under 35 USC 371 of International Application PCT/JP2007/073878 filed Dec. 11, 2007.

TECHNICAL FIELD

The present invention relates to an optical signal quality monitoring apparatus and method, and particularly to an optical signal quality monitoring apparatus and method which can correctly monitor quality of the optical signal modulated by a high-speed data signal.

BACKGROUND ART

In forming a network using the optical signal modulated by the data signal, it is necessary to monitor the quality of the optical signal propagating through the network with the optical signal monitoring apparatus.

Generally, the optical signal monitoring apparatus obtains information on a waveform of a signal on a transmission path, and computes a value indicating the signal quality from the waveform information and supplies the computation result. Therefore, in the optical signal monitoring apparatus, it is extremely difficult to obtain the waveform information by a photodetector directly receiving the optical signal which is modulated by a data signal having a bit rate very high as tens of Gb/s.

In a conventional optical signal quality monitoring apparatus, an equivalent time sampling method is adopted to obtain the information on the waveform of the high-speed optical signal.

In the equivalent time sampling method, sampling is performed to an optical signal P in which the same waveform is repeated at a period Ta as shown in (a) of FIG. 11 using a sampling pulse S having a period of Ts=N·Ta+ΔT which is slightly longer than N multiplications (N is an integer) of the period Ta by a time ΔT as shown in (b) of FIG. 11, thereby obtaining instantaneous amplitude values (instantaneous intensity) at positions shifted from each other by ΔT in the repetitive waveform of the optical signal P as shown in (c) of FIG. 11.

A waveform P' drawn by an envelope curve connecting the obtained instantaneous amplitude values is one in which the waveform of the optical signal P is enlarged by a factor of Ts/ΔT on a temporal axis. The waveform P' retains the waveform characteristics of the original optical signal P.

Accordingly, a probability distribution of an amplitude indicating one of binary levels and an amplitude indicating another of the binary levels is obtained for the waveform information obtained by the equivalent time sampling, and a Q value indicating the signal quality can be obtained by computation of a standard deviation of the probability distribution.

For example, Patent Document 1 discloses a technique of performing the equivalent time sampling to the optical signal to compute the Q value indicating the signal quality from the obtained waveform information.

Patent Document 1: Japanese Patent No. 3796357

However, in the technique disclosed in Patent Document 1, only an intensity-modulated optical signal can be monitored by the data signal, and it is impossible to monitor a modulation state of an optical signal phase-modulated by a Differential Phase-Shift Keying (DPSK) method or a Differential Quadrature Phase-Shift Keying (DQPSK) method whose use on an optical network are being studied.

DISCLOSURE OF INVENTION

In view of the foregoing, an object of the invention is to provide an optical signal monitoring apparatus and method which can monitor the modulation state of the phase-modulated optical signal.

In order to achieve the above-described object, according to a first aspect of the present invention, there is provided an optical signal monitoring apparatus comprising:

an optical interference unit (21) which includes:

an optical brancher (22) which branches a monitoring object optical signal (Px) into two optical paths, the monitoring object optical signal (Px) being input to be monitored and being phase-modulated at a predetermined symbol rate;

a delay device (23) which imparts delay corresponding to an integral multiple of one symbol to an optical signal (Pxa), the optical signal being branched in one optical path (La) of the two optical paths by the optical brancher (22);

an optical phase adjuster (24) which makes an adjustment such that an optical signal (Pxa') emitted from the delay device (23) and an optical signal (Pxb) are brought into a predetermined optical phase difference, the optical signal being branched in another optical path (Lb) of the two optical paths by the optical brancher (22); and an optical multiplexer (25) which multiplexes optical signals, the optical signals being adjusted so as to be brought into the predetermined optical phase difference by the optical phase adjuster (24), the optical interference unit (21) converting the phase-modulated monitoring object optical signal (Px) into intensity-modulated light (Py) to supply the intensity-modulated light (Py), the monitoring object optical signal (Px) being supplied from the optical multiplexer (25);

a sampling optical pulse generation unit (31) which produces a sampling optical pulse (Ps) having a period (Ts) different from a predetermined offset time ΔT to integral multiplication N of a symbol clock period corresponding to the predetermined symbol rate;

an optical sampling unit (32) which samples the intensity-modulated light (Py) using the sampling optical pulse (Ps) to supply an optical pulse signal (Pz), the intensity-modulated light (Py) being emitted from the optical interference unit (21), the sampling optical pulse (Ps) being produced by the sampling optical pulse generation unit (31);

a photoelectric converter (40) which receives the optical pulse signal (Pz) emitted from the optical sampling unit (32), and converts the optical pulse signal (Pz) into an electric signal (Ez) to supply the electric signal (Ez); and a computation unit (35) which computes a value indicating quality of the monitoring object optical signal (Px) based on the electric signal (Ez) supplied from the photoelectric converter (40), the monitoring object optical signal (Px) being phase-modulated at the predetermined symbol rate.

In order to achieve the above-described object, according to a second aspect of the present invention, there is provided the optical signal monitoring apparatus according to the first aspect, further including an optical switch (50) capable of feeding an intensity-modulated monitoring object optical signal (Px) into the optical sampling unit (32) while the optical interference unit (21) is not interposed therebetween, the intensity-modulated monitoring object optical signal (Px) being fed to be monitored instead of the monitoring object optical signal (Px) phase-modulated at the predetermined symbol rate.

In order to achieve the above-described object, according to a third aspect of the present invention, there is provided the optical signal monitoring apparatus according to the first aspect, further including:

a wavelength-variable light source (62) which emits wavelength-variable light (Pr);

an optical switch (63) which inputs the wavelength-variable light (Pr) into the optical interference unit (21) instead of the monitoring object optical signal (Px) phase-modulated at the predetermined symbol rate, the wavelength-variable light (Pr) being emitted by the wavelength-variable light source (62); and an adjusting photoelectric converter (64) which receives outgoing light (Pr') emitted from the optical interference unit (21) while the optical switch (63) inputs the wavelength-variable light (Pr) into the optical interference unit (21), wherein light having a wavelength identical to a wavelength of the monitoring object optical signal (Px) is input into the optical interference unit (21) from the wavelength-variable light source (62) through the optical switch (63), the monitoring object optical signal (Px) being phase-modulated at the predetermined symbol rate, and the optical phase adjuster (24) of the optical interference unit (21) is adjustable such that a level of an output signal from the adjusting photoelectric converter (64) becomes a predetermined value.

In order to achieve the above-described object, according to a fourth aspect of the present invention, there is provided the optical signal monitoring apparatus according to the first aspect, further including a wavelength-selective filter (61) which selectively inputs an optical signal (Px') having a desired wavelength from the monitoring object optical signal (Px) phase-modulated at the predetermined symbol rate.

In order to achieve the above-described object, according to a fifth aspect of the present invention, there is provided the optical signal monitoring apparatus according to the first aspect, wherein the delay device (23) of the optical interference unit (21) is configured to change a delay time according to a symbol rate of the monitoring object optical signal (Px) phase-modulated at the predetermined symbol rate.

In order to achieve the above-described object, according to a sixth aspect of the present invention, there is provided the optical signal monitoring apparatus according to the first aspect, wherein the optical phase adjuster (24) of the optical interference unit (21) is adjusted with respect to a monitoring object optical signal such that an optical phase difference between two optical signals multiplexed by the optical multiplexer (25) becomes 0 or π, the monitoring object optical signal being phase-modulated by a Differential Phase-Shift Keying (DPSK) method as the monitoring object optical signal (Px) phase-modulated at the predetermined symbol rate.

In order to achieve the above-described object, according to a seventh aspect of the present invention, there is provided the optical signal monitoring apparatus according to the first aspect, wherein the optical phase adjuster (24) of the optical interference unit (21) is adjusted with respect to a monitoring object optical signal such that an optical phase difference between two optical signals multiplexed by the optical multiplexer (25) becomes odd-numbered multiplication of π/4, the monitoring object optical signal being phase-modulated by a Differential Quadrature Phase-Shift Keying (DQPSK) method as the monitoring object optical signal (Px) phase-modulated at the predetermined symbol rate.

In order to achieve the above-described object, according to an eighth aspect of the present invention, there is provided the optical signal monitoring apparatus according to the first aspect, wherein the sampling optical pulse generation unit (31) includes:

a reference signal generator (31a) having a synthesizer configuration in which a stable signal (Ra) is produced, the stable signal (Ra) having a period Ts corresponding to a period of the sampling optical pulse;

a multiplier (31b) which supplies the stable signal (Ra) as a signal (Rb) multiplied by a factor of M (M is more than one), the stable signal (Ra) being produced by the reference signal generator (31a) and having the period Ts;

a light source (31d) which emits continuous light (Pcw);

an optical modulator (31c) which modulates the continuous light (Pcw) emitted from the light source (31d) by the signal (Rb) multiplied by the factor of M supplied from the multiplier (31b), thereby emitting an optical pulse having a period Ts/M;

an optical gating circuit (31e) which thins out the optical pulse (Pa) emitted from the optical modulator (31c) into 1/M, and converts the optical pulse (Pa) into an optical pulse (Pb) having the period Ts; and a dispersion-decreasing fiber (31f) which narrows a pulse width of the optical pulse (Pb) having the period Ts and converted by the optical gating circuit (31e), and supplies the optical pulse (Pb) as the sampling optical pulse (Ps).

In order to achieve the above-described object, according to a ninth aspect of the present invention, there is provided the optical signal monitoring apparatus according to the first aspect, wherein the optical sampling unit (32) includes:

an electroabsorption optical modulator (33) which has two optical terminals (33a, 33b) and a power supply terminal (33c), the two optical terminals (33a, 33b) being used to input and output light, the power supply terminal (33c) imparting an electric field to an optical path connecting the two optical terminals (33a, 33b), the electroabsorption optical modulator (33) having a characteristic in which an absorption index is changed with respect to the light propagating through the optical path according to a level of the electric field, the electroabsorption optical modulator (33) receiving the monitoring object optical signal (Px) at one of the two optical terminals (33a, 33b);

a direct-current power supply (34) which applies a predetermined direct-current voltage (Vdc) to the power supply terminal (33c) of the electroabsorption optical modulator (33), the electroabsorption optical modulator (33) exhibiting a high absorption index with respect to the monitoring object optical signal (Px) at the predetermined direct-current voltage (Vdc); and a photocoupler (35) which receives the sampling optical pulse (Ps) emitted from the sampling optical pulse generation unit (31) to input the sampling optical pulse (Ps) into another of the two optical terminals (33a, 33b) of the electroabsorption optical modulator (33), and receives the monitoring object optical signal (Px) to input the monitoring object optical signal (Px) in as the optical pulse signal (Pz) into the photoelectric converter (40), the monitoring object optical signal (Px) being output from the other of the two optical terminals (33a, 33b) of the electroabsorption optical modulator (33), wherein when the sampling optical pulse (Ps) is supplied, the absorption index is lowered by a mutual absorption saturation characteristic of the electroabsorption optical modulator (33), and the monitoring object optical signal (Px) is passed onto a side of the other of the two optical terminals (33a, 33b) of the electroabsorption optical modulator (33) to perform sampling.

In order to achieve the above-described object, according to a tenth aspect of the present invention, there is provided the optical signal monitoring apparatus according to the ninth aspect, wherein, in order to prevent leakage of the sampling optical pulse (Ps) to a transmission path of the monitoring object optical signal (Px), the sampling optical pulse (Ps) being input into the other of the two optical terminals (33a, 33b) of the electroabsorption optical modulator (33), the optical sampling unit (32) further includes:

a second photocoupler (36) which is inserted into the one of the two optical terminals (33a, 33b) of the electroabsorption optical modulator (33); and an optical terminator (37) which terminates the sampling optical pulse (Ps) through the second photocoupler (36).

In order to achieve the above-described object, according to an eleventh aspect of the present invention, there is provided the optical signal monitoring apparatus according to the first aspect, further including a parameter setting unit (38) which receives information on a symbol clock period Tc corresponding to the predetermined symbol rate modulating the monitoring object optical signal (Px) or information on a bit rate of the data signal and information on the predetermined offset time ΔT to obtain a sampling period Ts of the sampling optical pulse (Ps) from computation of $$Ts = N \cdot Tc + \Delta T$$

(where a value of N is determined by the symbol clock period Tc of the data signal and a frequency variable range of a signal which can be supplied from the sampling optical pulse generation unit (31)), the parameter setting unit (38) setting the sampling period Ts of the sampling optical pulse (Ps) in the sampling optical pulse generation unit (31).

In order to achieve the above-described object, according to a twelfth aspect of the present invention, there is provided the optical signal monitoring apparatus according to the first aspect, further including a analog/digital (A/D) converter (41) which is inserted between the photoelectric converter (40) and the computation unit (45), converts the electric signal (Ez) from the photoelectric converter (40) into a digital value by sampling the electric signal (Ez) with a sampling clock (Es) synchronized with the sampling optical pulse (Ps), and supplies the digital value as a data signal (Dz) to the computation unit (45).

In order to achieve the above-described object, according to a thirteenth aspect of the present invention, there is provided the optical signal monitoring apparatus according to the twelfth aspect, wherein the sampling clock (Es) is output while the sampling optical pulse generation unit (31) synchronizes the sampling clock with the sampling optical pulse (Ps).

In order to achieve the above-described object, according to a fourteenth aspect of the present invention, there is provided the optical signal monitoring apparatus according to the thirteenth aspect, wherein the computation unit (45) compares the data signals (Dz) from the A/D converter (41) with a predetermined threshold value to classify the data signals into a sample value belonging to data "1" and a sample value belonging to data "0", obtains an average value and a standard deviation of a group of sample values for each of the data "1" and the data "0", and obtains a ratio $\mu/\gamma$ of a difference $\mu$ between the average values of the data "1" and the data "0" and a sum $\gamma$ of the standard deviations as a quality value Q.

In order to achieve the above-described object, according to a fifteenth aspect of the present invention, there is provided an optical signal monitoring method comprising:

a step of preparing an optical interference unit (21) including: an optical brancher (22) which branches a monitoring object optical signal (Px) into two optical paths, the monitoring object optical signal (Px) being input to be monitored and being phase-modulated at a predetermined symbol rate; a delay device (23) which imparts delay corresponding to an integral multiple of one symbol to an optical signal (Pxa), the optical signal being branched in one optical path (La) of the two optical paths by the optical brancher (22); an optical phase adjuster (24) which makes an adjustment such that outgoing light (Pxa') of the delay device (23) and an optical signal (Pxb) are brought into a predetermined optical phase difference, the optical signal being branched in another optical path (Lb) of the two optical paths by the optical brancher (22); and an optical multiplexer (25) which multiplexes the optical signals, the optical signals being adjusted so as to be brought into the predetermined optical phase difference by the optical phase adjuster (24), the optical interference unit (21) converting the phase-modulated monitoring object optical signal (Px) into intensity-modulated light (Py) to supply the intensity-modulated light (Py), the monitoring object optical signal (Px) being supplied from the optical multiplexer (25);

a sampling optical pulse generation step of producing a sampling optical pulse (Ps) having a period (Ts) different from a predetermined offset time ΔT to integral multiplication of a symbol clock period corresponding to the predetermined symbol rate;

an optical sampling step of sampling the intensity-modulated light (Py) using the sampling optical pulse (Ps) to supply an optical pulse signal (Pz), the intensity-modulated light (Py) being emitted from the optical interference unit (21), the sampling optical pulse (Ps) being produced by the sampling optical pulse generation unit (31);

a photoelectric conversion step of receiving the optical pulse signal (Pz) emitted from the optical sampling step, and converting the optical pulse signal (Pz) into an electric signal (Ez) to supply the electric signal (Ez); and a computation step of computing a value indicating quality of the monitoring object optical signal (Px) based on the electric signal (Ez) supplied from the photoelectric conversion step, the monitoring object optical signal (Px) being phase-modulated at the predetermined symbol rate.

In order to achieve the above-described object, according to a sixteenth aspect of the present invention, there is provided the optical signal monitoring method according to the fifteenth aspect, further including a step of preparing an optical switch (50) capable of inputting an intensity-modulated monitoring object optical signal (Px) into the optical sampling step while the optical interference unit (21) is not interposed therebetween, the intensity-modulated monitoring object optical signal (Px) being input to be monitored instead of the monitoring object optical signal (Px) phase-modulated at the predetermined symbol rate.

In order to achieve the above-described object, according to a seventeenth aspect of the present invention, there is provided the optical signal monitoring method according to the fifteenth aspect, further including:

a step of preparing a wavelength-variable light source (62) which emits wavelength-variable light (Pr);

a step of preparing an optical switch (63) which inputs the wavelength-variable light (Pr) into the optical interference unit (21) instead of the monitoring object optical signal (Px) phase-modulated at the predetermined symbol rate, the wavelength-variable light (Pr) being emitted from the wavelength-variable light source (62); and a step of preparing an adjusting photoelectric converter (64) which receives outgoing light (Pr') emitted from the optical interference unit (21) while the optical switch (63) inputs the wavelength-variable light (Pr) into the optical interference unit (21), wherein light having a wavelength identical to a wavelength of the monitoring object optical signal (Px) is input into the optical interference unit (21) from the wavelength-variable light source (62) through the optical switch (63), the monitoring object optical signal (Px) being phase-modulated at the predetermined symbol rate, and the optical phase adjuster (24) of the optical interference unit (21) is adjustable such that a level of an output signal from the adjusting photoelectric converter (64) becomes a predetermined value.

In order to achieve the above-described object, according to an eighteenth aspect of the present invention, there is provided the optical signal monitoring method according to the fifteenth aspect, further including a step of preparing a wavelength-selective filter (61) which selectively inputs an optical signal (Px') having a desired wavelength from the monitoring object optical signal (Px) phase-modulated at the predetermined symbol rate.

In order to achieve the above-described object, according to a nineteenth aspect of the present invention, there is provided the optical signal monitoring method according to the fifteenth aspect, wherein the delay device (23) of the optical interference unit (21) is configured to change a delay time according to a symbol rate of the monitoring object optical signal (Px) phase-modulated at the predetermined symbol rate.

In order to achieve the above-described object, according to a twentieth aspect of the present invention, there is provided the optical signal monitoring method according to the fifteenth aspect, wherein the optical phase adjuster (24) of the optical interference unit (21) is adjusted with respect to a monitoring object optical signal such that an optical phase difference between two optical signals multiplexed by the optical multiplexer (25) becomes 0 or π, the monitoring object optical signal being phase-modulated by a Differential Phase-Shift Keying (DPSK) method as the monitoring object optical signal (Px) phase-modulated at the predetermined symbol rate.

In order to achieve the above-described object, according to a twenty-first aspect of the present invention, there is provided the optical signal monitoring method according to the fifteenth aspect, wherein the optical phase adjuster (24) of the optical interference unit (21) is adjusted with respect to a monitoring object optical signal such that an optical phase difference between two optical signals multiplexed by the optical multiplexer (25) becomes odd-numbered multiplication of π/4, the monitoring object optical signal being phase-modulated by a Differential Quadrature Phase-Shift Keying (DQPSK) method as the monitoring object optical signal (Px) phase-modulated at the predetermined symbol rate.

Thus, in the optical signal monitoring apparatus and method of the invention, the optical interference unit branches the phase-modulated monitoring object optical signal into two, a delay corresponding to an integral multiple of one symbol is imparted to one of the branched optical signals, and the one of the branched optical signals and another of the branched optical signals are multiplexed with the predetermined optical phase difference. Therefore, the phase-modulated optical signal is converted into the intensity-modulated light and waveform information of the intensity-modulated light is obtained by performing sampling, so that the quality of the phase-modulated light can be monitored.

In the optical signal monitoring apparatus of the invention including the optical switch which can input the intensity-modulated monitoring object optical signal into the optical sampling unit while the optical interference unit is not interposed therebetween, not only the phase-modulated light but the intensity-modulated light can be monitored as the monitoring object optical signal.

In the optical signal monitoring apparatus of the invention in which the optical phase adjuster of the optical interference unit can be adjusted such that the light having the same wavelength as the monitoring object optical signal is input into the optical interference unit from the wavelength-variable light source to bring the level of the output signal of the adjusting photoelectric converter into a predetermined value, the different wavelengths of the phase-modulated monitoring object optical signal can be converted into the intensity-modulated light beam.

In the optical signal monitoring apparatus of the invention including the wavelength-selective filter which selectively input the optical signal having the desired wavelength from the monitoring object optical signal, the input optical signal having the desired multiplexed wavelength can selectively be monitored as the monitoring object optical signal from the network.

The delay device of the optical interference unit which is configured to be able to change the delay time according to the symbol rate of the phase-modulated monitoring object optical signal can deal with the optical signals having the different symbol rates.

BRIEF DESCRIPTION OF DRAWINGS

FIG. 1 is a block diagram for explaining a configuration of optical signal monitoring apparatus and method according to a first embodiment of the invention.

FIG. 4 is a view for explaining an example of a configuration of the main part of FIG. 1.

FIG. 5 is a view for explaining an example of characteristics of the main part of FIG. 1.

BEST MODE FOR CARRYING OUT THE INVENTION

Figures 2, 3:
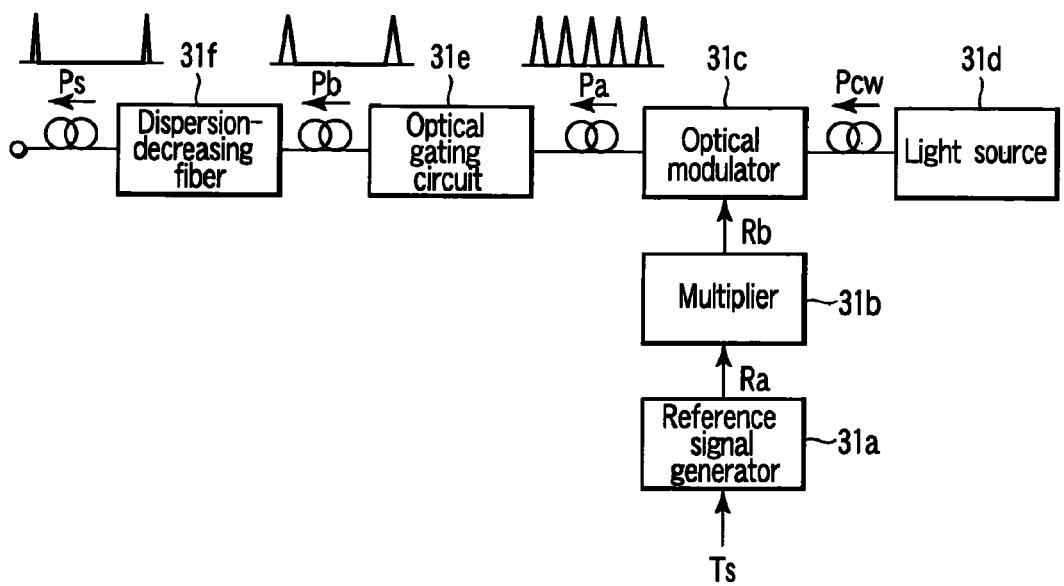
FIG. 2 is a waveform chart for explaining an operation of a main part of FIG. 1.
FIG. 3 is a view for explaining an example of a configuration of the main part of FIG. 1.

An apparatus and a method for monitoring optical signal according to an embodiment of the invention will be described below with reference to the drawings.

FIG. 1 is a block diagram showing configurations of an optical signal monitoring apparatus 20 and a method thereof according to a first embodiment of the invention, in which a monitoring object optical signal Px phase-modulated by the DPSK (Differential Phase-Shift Keying) method is monitored at a predetermined symbol rate.

A basic configuration of the optical signal monitoring apparatus 20 according to the invention is characterized by including an optical interference unit 21 which includes an optical brancher 22 which branches a monitoring object optical signal Px into two optical paths, the monitoring object optical signal Px being input to be monitored and being phase-modulated at a predetermined symbol rate; a delay device 23 which imparts delay corresponding to an integral multiple of one symbol to an optical signal Pxa, the optical signal Pxa being branched in a path La of the two optical paths by the optical brancher 22; an optical phase adjuster 24 which makes an adjustment such that outgoing light Pxa' of the delay device 23 and an optical signal Pxb are brought into a predetermined optical phase difference, the optical signal Pxb being branched in another optical path Lb of the two optical paths; an optical multiplexer 25 which multiplexes the optical signals, the optical signals being adjusted so as to be brought into the predetermined optical phase difference by the optical phase adjuster 24, the optical interference unit 21 converting the phase-modulated monitoring object optical signal Px into intensity-modulated light Py to supply the intensity-modulated light Py, the monitoring object optical signal Px being supplied from the optical multiplexer 25; a sampling optical pulse generation unit 31 which produces a sampling optical pulse Ps, the sampling optical pulse Ps having a period Ts different from a predetermined offset time ΔT to integral multiplication of a symbol clock period corresponding to the predetermined symbol rate; an optical sampling unit 32 which samples the intensity-modulated light Py using the sampling optical pulse Ps to supply an optical pulse signal Pz, the intensity-modulated light Py being supplied from the optical interference unit 21, the sampling optical pulse Ps being produced by the sampling optical pulse generation unit 31; a photoelectric converter 40 which receives the optical pulse signal Pz supplied from the optical sampling unit 32, and converts the optical pulse signal Pz into an electric signal Ez to supply the electric signal Ez; and a computation unit 35 which computes a value indicating quality of the monitoring object optical signal Px based on the electric signal Ez supplied from the photoelectric converter 40, the monitoring object optical signal Px being phase-modulated at the predetermined symbol rate.

A basic configuration of an optical signal monitoring method according to the invention is characterized by including a step of preparing an optical interference unit 21 which includes an optical brancher 22 which branches a monitoring object optical signal Px into two optical paths, the monitoring object optical signal Px being input to be monitored and being phase-modulated at a predetermined symbol rate; a delay device 23 which imparts delay corresponding to an integral multiple of one symbol to an optical signal Pxa, the optical signal Pxa being branched in one optical path La of the two optical paths by the optical brancher 22; an optical phase adjuster 24 which makes an adjustment such that outgoing light Pxa' of the delay device 23 and an optical signal Pxb are brought into a predetermined optical phase difference, the optical signal Pxb being branched in another optical path Lb of the two optical paths; and an optical multiplexer 25 which multiplexes the optical signals, the optical signals being adjusted so as to be brought into the predetermined optical phase difference by the optical phase adjuster 24, the optical interference unit 21 converting the phase-modulated monitoring object optical signal Px into intensity-modulated light Py to supply the intensity-modulated light Py, the monitoring object optical signal Px being supplied from the optical multiplexer 25; a sampling optical pulse generation step of producing a sampling optical pulse Ps, the sampling optical pulse Ps having a period Ts different from a predetermined offset time ΔT to integral multiplication of a symbol clock period corresponding to the predetermined symbol rate; an optical sampling step of sampling the intensity-modulated light Py using the sampling optical pulse Ps to supply an optical pulse signal Pz, the intensity-modulated light Py being supplied from the optical interference unit 21, the sampling optical pulse Ps being produced by the sampling optical pulse generation unit 31; a photoelectric conversion step of receiving the optical pulse signal Pz supplied from the optical sampling step, and converting the optical pulse signal Pz into an electric signal Ez to supply the electric signal Ez; and a computation step of computing a value indicating quality of the monitoring object optical signal Px based on the electric signal Ez supplied from the photoelectric conversion step, the monitoring object optical signal Px being phase-modulated at the predetermined symbol rate.

The optical signal monitoring apparatus 20 and the method thereof of the first embodiment, in which the monitoring object optical signal Px phase-modulated by the DPSK (Differential Phase-Shift Keying) method is monitored at a predetermined symbol rate, will specifically be described below.

In the DPSK method, the phase modulation is performed such that signal phase is changed by π for the data "0" while not changed for data "1" (in this case, a relationship of data "0" and data "1" may be reversed). In the DPSK method, the symbol rate is matched with the bit rate.

The monitoring object optical signal Px phase-modulated by the DPSK method is incident to the optical interference unit 21 through an incident terminal 20a.

The optical interference unit 21 includes the optical brancher 22 which branches the input monitoring object optical signal Px into two optical paths La and Lb; the delay device 23 which imparts the delay corresponding to an integral multiple of one symbol (in the case of DPSK method, integral multiplication of one bit) to the optical signal Pxa supplied to the optical path La; the optical phase adjuster 24 which adjusts the phase of at least one (in this example, light Pxa') of the outgoing light Pxa' from the delay device 23 and the light Pxb of the optical path Lb such that the optical phase difference between the two light becomes a predetermined value (in this case, 0 or π) after the adjustment; and the optical multiplexer 25 which multiplexes the light Pxa" and Pxb, the light Pxa" and Pxb being adjusted so as to be brought into the predetermined optical phase difference by the optical phase adjuster 24.

The optical phase adjuster 24 may be inserted into the side of the optical path Lb.

Thus, the optical signal phase-modulated by the DPSK method is divided into the two optical signals Pxa and Pxb, the delay of one symbol is imparted to the optical signal Pxa, and the optical signals Pxa and Pxb are multiplexed with the optical phase difference of 0 or $\pi$, so that the phase-modulated and fed monitoring object optical signal Px can be converted into the intensity-modulated light Py to supply the intensity-modulated light Py.

For example, in the DPSK method, as shown in (a) and (b) of FIG. 2, the phase of the monitoring object optical signal Px phase-modulated by the data signal is changed by $\pi$ every time the data becomes "0" and the phase is not changed when the data becomes "1".

However, even in the case where the data becomes "0", the phase is changed from $\pi$ to $\pi$ to become $2\pi(=0)$ when the phase is already changed to $\pi$.

As shown in (c) of FIG. 2, a phase of an optical signal Px' in which the phase of the optical signal Px is delayed by one bit.

When the optical signals Px and Px' are multiplexed, the intensity-modulated light is obtained while the bits are mutually reinforced when the optical signals Px and Px' have the same phase bits (0,0) and ($\pi,\pi$), and the intensity-modulated light is obtained while the bits are mutually impaired when the optical signals Px and Px' have the reverse phase bits ($\pi$,0) and (0,$\pi$).

At this point, when the data "0" is allocated to the same phase bit while the data "1" is allocated to the reverse phase bit, the original data signal can be reproduced as shown in (d) of FIG. 2.

That is, the optical interference unit 21 converts the optical signal Px phase-modulated by the data signal into the optical signal Py intensity-modulated by the data signal, and supplies the optical signal Py. The modulation state of the optical signal Py, that is, the modulation state of the phase-modulated optical signal Px can be understood by monitoring the waveform of the optical signal Py.

In order to obtain the information on the waveform of the optical signal Py, the optical signal Py is input into the optical sampling unit 32 along with the sampling optical pulse Ps supplied from the sampling optical pulse generation unit 31.

The sampling optical pulse generation unit 31 generates a sampling optical pulse Ps to supply the sampling optical pulse Ps to the optical sampling unit 32. The sampling optical pulse Ps has a period Ts different from the predetermined offset time $\Delta$T to the integral multiplications N (N is an integer) of the symbol clock period Tc (in this case, the clock period of the data signal modulating the optical signal Px) of the optical signal Px.

Any configuration may be adopted for the sampling optical pulse generation unit 31 as long as the sampling optical pulse generation unit 31 can produce the period Ts in which the optical pulse having a narrow width is specified.

FIG. 3 is a block diagram showing an example of the sampling optical pulse generation unit 31.

The sampling optical pulse generation unit 31 includes a reference signal generator 31*a* having a synthesizer configuration in which a stable signal Ra is produced, the stable signal Ra having the period Ts (frequency Fs) corresponding to a period specified from a later-mentioned parameter setting unit 38; a multiplier 31*b* which supplies the stable signal Ra as a signal Rb multiplied by a factor of M (M is more than one), the stable signal Ra having the period Ts (frequency Fs) and produced by the reference signal generator 31*a*; a light source 31*d* which emits continuous light Pcw; an optical modulator 31*c* which modulates the continuous light Pcw by the signal Rb multiplied by the factor of M, thereby supplying an optical pulse Pa having a period Ts/M, the continuous light Pcw being supplied from the light source 31*b*, the signal Rb being supplied from the multiplier 31*b*; an optical gating circuit 31*e* which thins out the optical pulse Pa into 1/M, the optical pulse Pa being supplied from the optical modulator 31*c*, and converts the optical pulse Pa into an optical pulse Pb having the period Ts; and a dispersion-decreasing fiber 31*f* which narrows a pulse width of the optical pulse Pb having the period Ts and converted by the optical gating circuit 31*e*, the dispersion-decreasing fiber 31*f* supplying the optical pulse in the form of the sampling optical pulse Ps.

That is, the reference signal generator 31*a* having the synthesizer configuration produces the stable signal Ra having the period Ts (frequency Fs) specified by a parameter setting unit 38 described later. The stable signal Ra is input into the multiplier 31*b*, which multiplies the stable signal Ra by the factor of M (M is more than one). Then, the output signal Rb is input into the optical modulator 31*c*, which modulates the continuous light Pcw emitted from the light source 31*d*, thereby generating the optical pulse Pa having the period Ts/M.

The pulse width of the optical pulse Pa is narrowed to 1/M in comparison with the case where the continuous light Pcw is directly modulated by the signal Ra.

The optical gating circuit 31*e* thins out the optical pulse Pa into 1/M, and the optical pulse Pa is converted into the optical pulse Pb having the period Ts. Then, the optical pulse Pb is input into the dispersion-decreasing fiber 31*f* to narrow the pulse width of the optical pulse Pb, and is finally supplied as the sampling optical pulse Ps.

On the other hand, the optical sampling unit 32 performs the sampling of the monitoring object optical signal Py using the sampling optical pulse Ps emitted from the sampling optical pulse generation unit 31, and supplies the optical pulse signal Pz. The optical pulse signal Pz is obtained by the sampling performed by the optical sampling unit 32.

Usually a non-linear optical member is used as the optical sampling unit 32. However, because the non-linear optical member has low conversion efficiency, the weak optical signal is hardly monitored.

Therefore, in order to perform the correct monitoring even in the weak optical signal, as shown in FIG. 4, the optical sampling unit 32 includes the electroabsorption optical modulator 33, the direct-current power supply 34, and the circulator type photocoupler 35.

The electroabsorption optical modulator 33 has the two optical terminals 33*a* and 33*b* and the power supply terminal 33*c*. The two optical terminals 33*a* and 33*b* are used to input and output light, and the power supply terminal 33*c* imparts the electric field to the optical path between the two optical terminals 33*a* and 33*b*. The electroabsorption optical modulator 33 has the characteristic in which the absorption index is changed with respect to the light propagating through the optical path according to the level of the electric field imparted to the optical path.

Usually, in the electroabsorption optical modulator, an electric sampling pulse signal is imparted to the power supply terminal 33*c*.

In the case of the electric sampling pulse signal, it is extremely difficult to produce the electric sampling pulse signal having the narrow width necessary to obtain the information on the waveform of tens of Gb/s.

Therefore, in the optical sampling unit 32 of the first embodiment, as shown in FIG. 4, the optical signal Px is input into the optical terminal 33a of the electroabsorption optical modulator 33, the sampling optical pulse Ps having the narrow width is input into the other optical terminal 33b through the photocoupler 35 while the predetermined direct-current voltage Vd indicating the high absorption index with respect to the optical signal Px is imparted from the direct-current power supply 34 to the power supply terminal 33c, the mutual absorption saturation characteristic of the electroabsorption optical modulator 33 is utilized to change the absorption index using the sampling optical pulse Ps, and the absorption index is lowered with respect to the monitoring object optical signal Px only when the sampling optical pulse Ps is input. Therefore, the monitoring object optical signal Px is passed toward the other optical terminal 33b to perform the sampling using the optical sampling pulse signal.

When the electroabsorption optical modulator 33 is used as the element for sampling the optical signal to perform the sampling with the optical sampling pulse signal, the sampling efficiency is determined by the insertion loss of the electroabsorption optical modulator 33.

Because the electroabsorption optical modulator 33 has the insertion loss of about −10 dB, the sampling efficiency of the first embodiment becomes about −10 dB.

For the use of the electroabsorption optical modulator 33 of the first embodiment, the sampling efficiency of about −10 dB is improved by about 10 dB or more in comparison with the case where the non-linear optical material is used as the element for sampling the optical signal.

In the case where a change in characteristic of the absorption index with respect to the electric field of the electroabsorption optical modulator 33 is shown by the letter F of FIG. 5, it is assumed that the direct-current voltage Vdc corresponding to the electric field in which the absorption index becomes a large value α (for example, 20 dB) is applied to the power supply terminal 33c of the electroabsorption optical modulator 33.

The sampling optical pulse Ps is input into the optical terminal 33b of the electroabsorption optical modulator 33 such that the electric field is substantially changed into a direction of an arrow A of FIG. 5 by the mutual absorption saturation characteristic to decrease the absorption index having peak intensity of a small value β (for example, 3 dB).

The characteristic F is schematically shown in FIG. 5.

That is, when the sampling optical pulse Ps is input into the optical terminal 33b of the electroabsorption optical modulator 33, the absorption index of electroabsorption optical modulator 33 is lowered by the mutual absorption saturation characteristic of the electroabsorption optical modulator 33.

Therefore, the monitoring object optical signal Px which is input into the optical terminal 33a of the electroabsorption optical modulator 33 is permitted to be passed through the electroabsorption optical modulator 33 in the form of the optical pulse signal Pz. The optical pulse signal Pz has the peak value lower than the instantaneous intensity at that time by a level corresponding to the insertion loss of the electroabsorption optical modulator 33.

Thus, the monitoring object optical signal Px passed through the electroabsorption optical modulator 33 is supplied in the form of the optical pulse signal Pz from the optical terminal 33b of the electroabsorption optical modulator 33 through the photocoupler 35 of the optical sampling unit 32.

Not only the circulator type in which the optical path is branched according to the light incident direction but also a spectral type in which the optical path is branched according to a difference in wavelength can be used as the photocoupler 35 of the optical sampling unit 32. The sampling optical pulse Ps having the wavelength different from that of the optical signal Px is used in the case of the spectral type.

In the circulator type photocoupler 36 inserted in the optical terminal 33a of the electroabsorption optical modulator 33, an optical terminator 37 terminates the sampling optical pulse Ps which is input into the optical terminal 33b and supplied from the optical terminal 33a in order to prevent the incidence (leakage) of the monitoring object optical signal Px to the transmission path.

The parameter setting unit 38 sets the periods Ts of the sampling optical pulse Ps and electric sampling clock Es, which are supplied from the sampling optical pulse generation unit 31.

The parameter setting unit 38 receives the information on the symbol clock period Tc (or bit rate) corresponding to the symbol rate of the monitoring object optical signal Px and the information on the offset time $\Delta T$, and obtains the sampling period Ts from the computation of $$Ts = N \cdot Tc + \Delta T$$

to set the obtained sampling period Ts in the sampling optical pulse generation unit 31.

At this point, the value of N is determined by the symbol clock period Tc and the frequency variable range of the signal which can be supplied from the sampling optical pulse generation unit 31.

For example, it is assumed that the offset time $\Delta T$ is so small that the offset time $\Delta T$ is negligible for the sampling period Ts, and that the clock period Tc is about 0.1 ns (10 GHz) while the sampling period Ts can be changed around 0.1 μs (10 MHz). Then, the value of N becomes about Ts/Tc=1000.

The optical pulse signal Pz from the optical sampling unit 32 is fed into the photoelectric converter 40 through the photocoupler 35, and the photoelectric converter 40 converts the optical pulse signal Pz into the electric signal Ez and outputs the electric signal Ez.

The analog/digital (A/D) converter 31 performs the sampling of the electric signal Ez supplied from the photoelectric converter 40, and converts the electric signal Ez into a digital data signal Dz and feeds the digital data signal Dz into the computation unit 45.

The sampling is performed by The A/D converter 41 using an electric sampling clock Es synchronized with the sampling optical pulse Ps.

In the first embodiment, it is assumed that the electric sampling clock Es is also supplied from the sampling optical pulse generation unit 31 (the reference signal generator 31a).

A computation unit 45 computes a value indicating the quality of the monitoring object optical signal Px based on the data signal Dz from the A/D converter 41.

Any computation technique may be used to compute the value of the quality. For example, as described in Patent Document 1, the data signals Dz obtained in a predetermined period are compared with a predetermined threshold to classify the data signals Dz into a sample value belonging to data "1" and a sample value belonging to data "0", an average value and a standard deviation of a group of the sample values are obtained for each of the data "1" and the data "0", and a ratio $\mu/\gamma$ of a difference $\mu$ between the average values to the sum $\gamma$ of the standard deviations is obtained as a quality value Q.

The signal quality of the monitoring object optical signal Px is enhanced as the Q value is increased.

A relationship between a waveform of the optical signal Py obtained by the modulation transform in the optical interference unit 21 and waveform obtaining timing will be described below.

Figure 6:
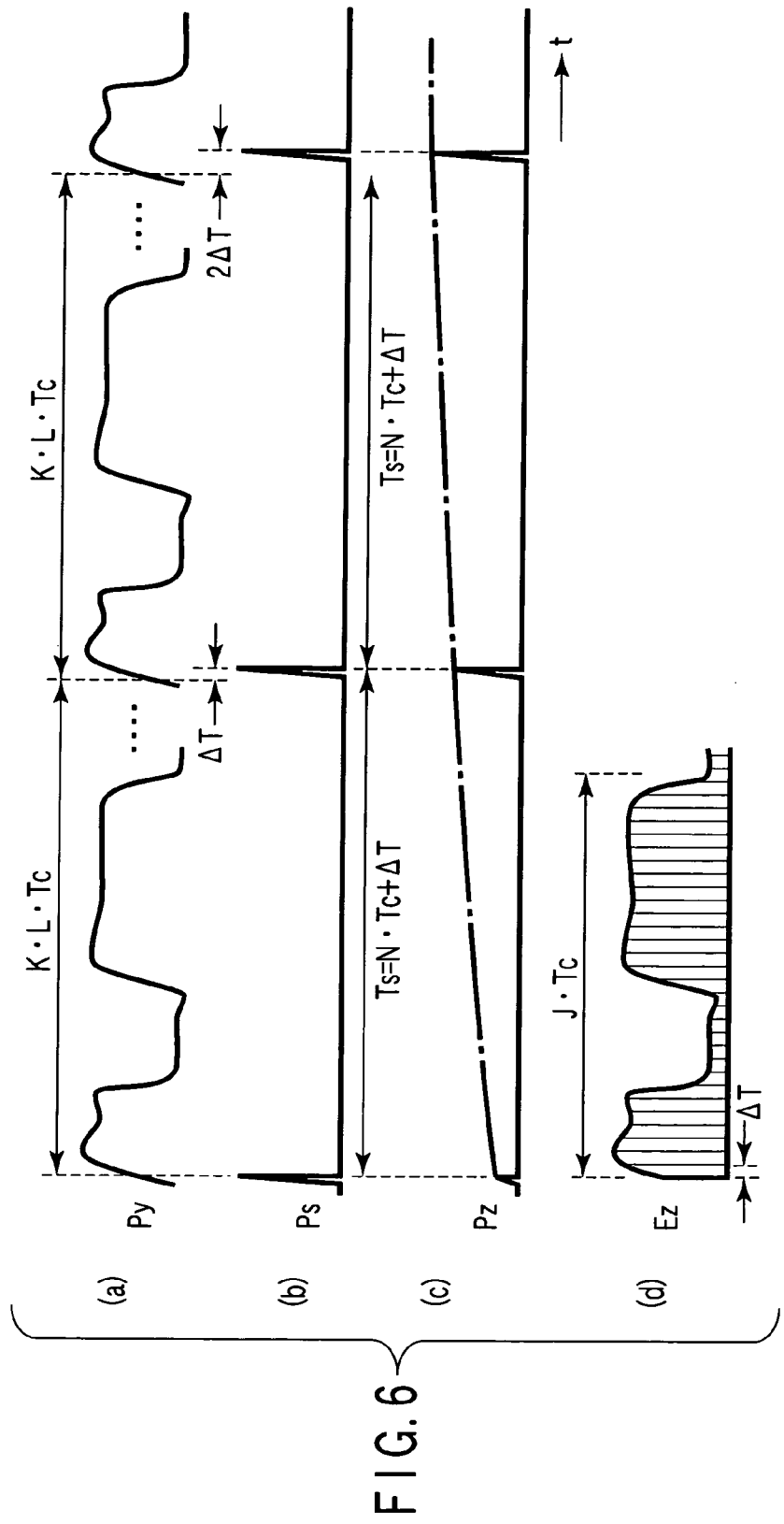
FIG. 6 is a waveform chart for explaining an operation for an optical signal having a repetitive waveform, which is an operation performed by the configuration of FIG. 1 of the first embodiment.

In the case where the monitoring object optical signal Px is used for a test and repeatedly modulated (phase-modulated) by the data signal of a predetermined code string having a predetermined bit length L, the optical interference unit 21 supplies the optical signal Py repeatedly intensity-modulated by the predetermined code string as shown in (a) of FIG. 6.

In the state in which the N value determining the period Ts of the sampling optical pulse Ps is equal to the integral K multiplication of the bit length L as shown in (b) of FIG. 6, the sampling is performed to the optical signal Py repeatedly intensity-modulated by the predetermined code string, thereby obtaining the optical pulse signal Pz having an envelope-curve waveform in which a temporal axis of the optical signal Py is enlarged as shown in (c) and (d) of FIG. 6.

That is, the sampling can substantially be performed in time series each ΔT time to the repetitive waveform of the optical signal Py.

The sampling is continuously performed U·Tc/ΔT times (U is an integer), which allows the waveform data of the U bits to be obtained in time series from the sampling start timing. A quality value Q is obtained by performing the computation processing to the waveform data.

Although the quality value Q is obtained for the waveform of the optical signal Py, because a variation in amplitude of the optical signal Py corresponds to a variation in phase modulation of the original optical signal Px, the quality value Q indicates right or wrong of the modulation state of the phase-modulated optical signal Px.

Figure 7:
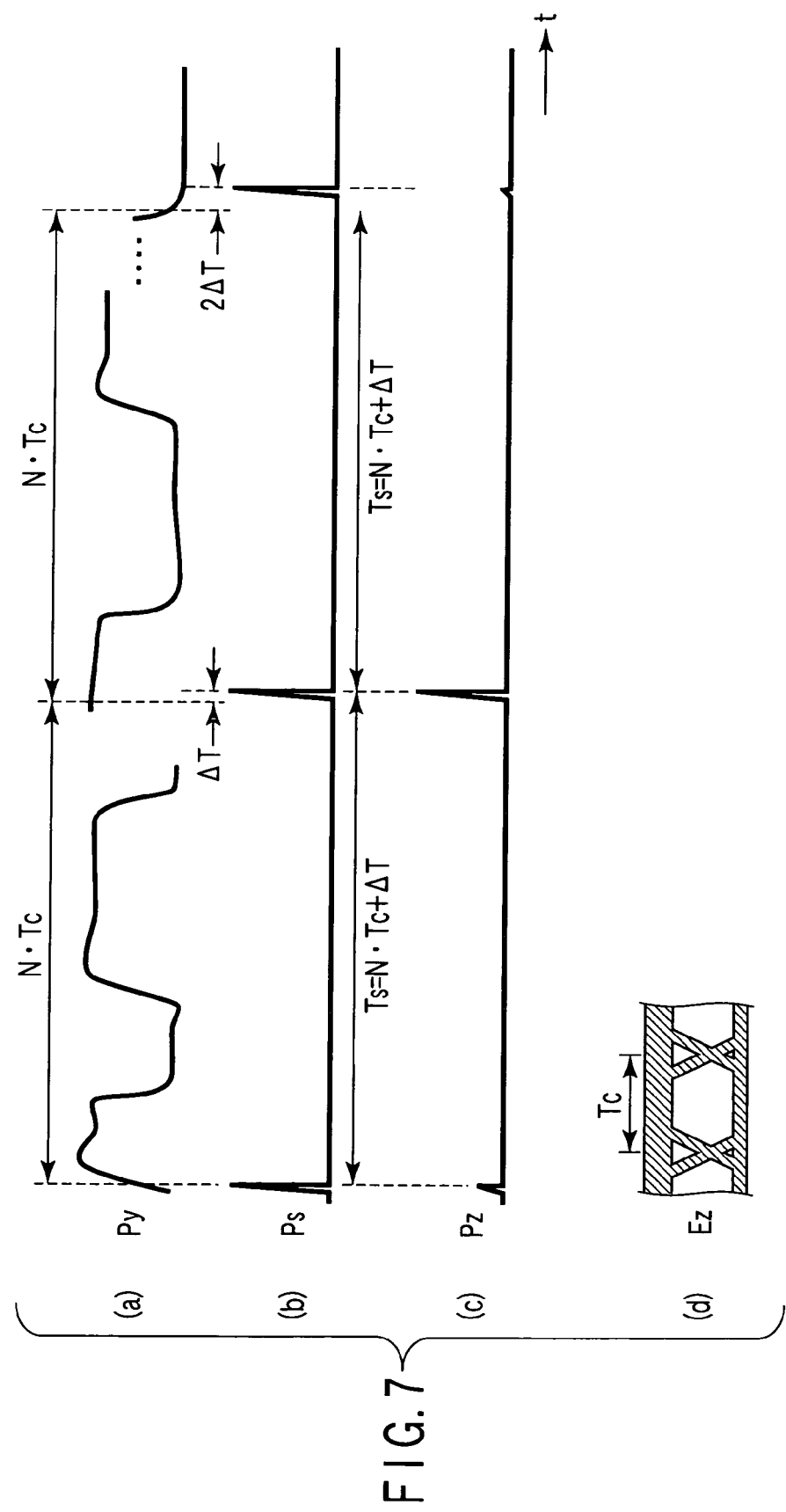
FIG. 7 is a waveform chart for explaining an operation for an optical signal not having the repetitive waveform, which is the operation performed by the configuration of FIG. 1 of the first embodiment.

Because the optical signal Px actually transmitted on the optical network is not modulated by the same code string, the optical signal Py obtained by the modulation transform of the optical signal Px does not have the simple repetitive waveform shown in (a) of FIG. 6, but has a complicated waveform shown in (a) of FIG. 7.

In the case where the sampling is performed with the period Ts of N·Tc+ΔT shown in (b) of FIG. 7 to the optical signal Py having the complicated repetitive waveform, because the sampling is performed to every N-bit data of the optical signal Py at timing shifted by ΔT, the value obtained by the sampling becomes an amplitude corresponding to the data "1" or the data "0" or an amplitude in a transition state between the data "1" and the data "0" as shown in (c) of FIG. 7, and the sampling result cannot be obtained for the continuous waveform having a constant interval of the optical signal Px.

Accordingly, an eye pattern is obtained as shown in (d) of FIG. 7 by overlapping the pieces of waveform data obtained by plural-time measurement, and a value indicating the quality of the optical signal can be obtained from the eye pattern.

Alternatively, the sampling is continuously performed for a predetermined interval to obtain the statistical amount, which allows the quality value Q of the optical signal to be obtained.

The synchronous sampling in which the eye pattern is obtained because the sampling is synchronized with the optical signal Px has been described in the above example. However, in the case of the asynchronous sampling in which the sampling is not synchronized with the optical signal Px, because the waveform of the obtained data results in streams, the eye pattern cannot be observed.

Even in the asynchronous sampling, the sampling is continuously performed for a predetermined time interval to obtain the statistical amount, which allows the quality value Q of the optical signal to be obtained.

In order that the optical signal monitoring apparatus 20 having the above-described configuration monitors the optical signals having the symbol clock periods Tc (bit rate), the delay amount of the delay device 23 of the optical interference unit 21 is manually changed according to the symbol clock period Tc, and the adjustment may manually be performed such that the shift of the optical phase is not generated in the optical phase adjuster 24.

Instead of manually adjusting the shift of the optical phase in the optical phase adjuster 24 while manually changing the delay amount of the delay device 23, as shown by a broken line of FIG. 1, a technique of automatically setting the delay amount of the delay device 23 and the shift of the optical phase in the optical phase adjuster 24 to values corresponding to the symbol clock period Tc through the parameter setting unit 38 may be adopted.

Second Embodiment

Figure 8:
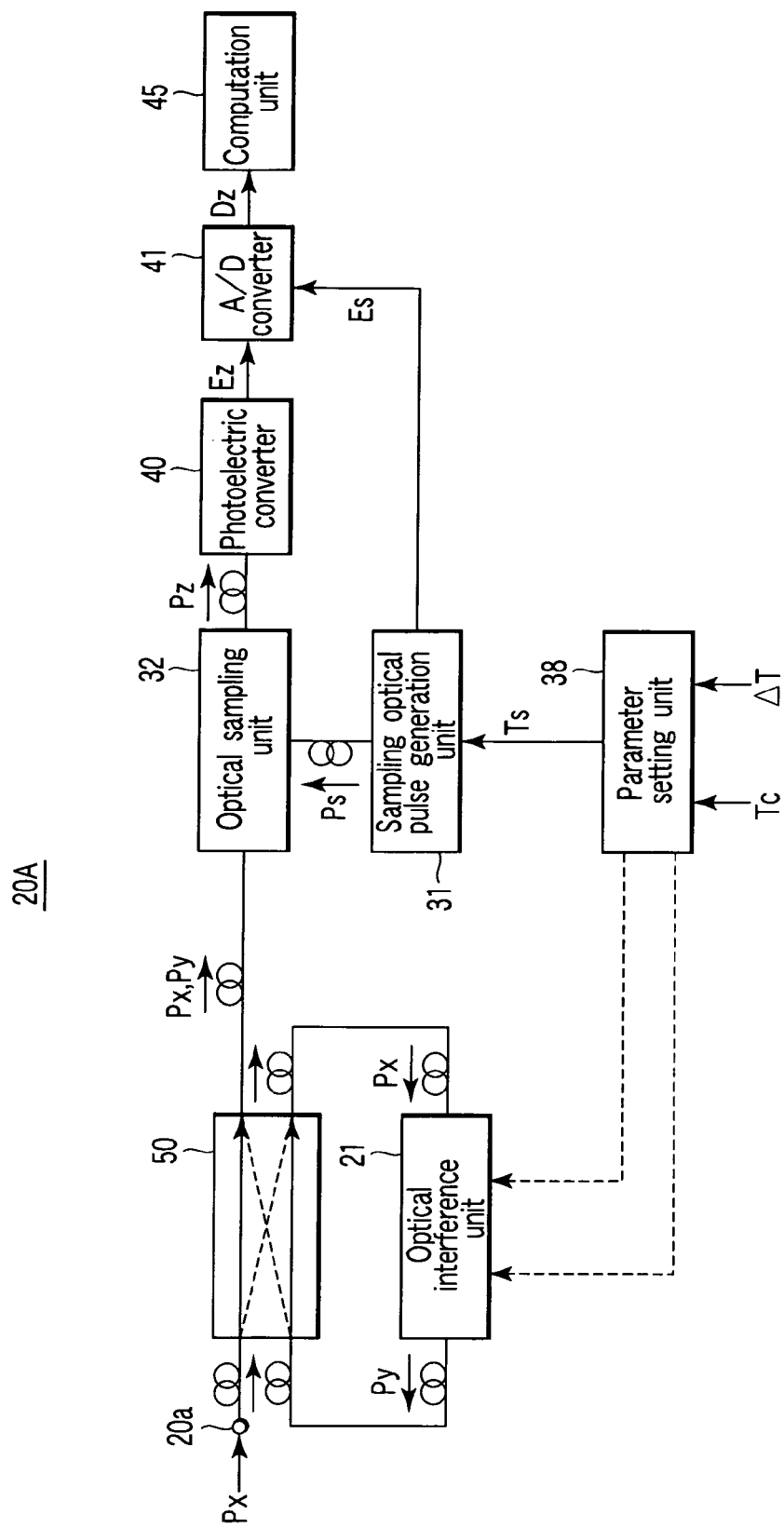
FIG. 8 is a block diagram for explaining a configuration of optical signal monitoring apparatus and method according to a second embodiment of the invention.

FIG. 8 is a block diagram showing a configuration of optical signal monitoring apparatus and method according to a second embodiment of the invention.

In FIG. 8, the same components as those the first embodiment of FIG. 1 are designated by the same reference numerals, and the description thereof is omitted.

That is, only the phase-modulated optical signal Px is monitored in the first embodiment.

On the other hand, in an optical signal monitoring apparatus 20A of the second embodiment shown in FIG. 8, an optical switch 50 is provided in parallel with the optical interference unit 21 between the incident terminal 20a and the optical sampling unit 31, and the optical switch 50 switches between a state in which the optical signal Px input into an incident terminal 20a is input into the optical interference unit 21 and a state in which the optical signal Px is directly input into the optical sampling unit 31 while the optical interference unit 21 is not interposed therebetween.

Therefore, when the optical switch 50 directly inputs the optical signal Px input into the incident terminal 20a into the optical sampling unit 31 while the optical interference unit 21 is not interposed therebetween, even if the optical signal input into the incident terminal 20a is the intensity-modulated optical signal Px, the intensity-modulated optical signal Px can also be monitored.

In the second embodiment, a two-input and two-output type switch in which switching is performed between the parallel connection and crossover connection is used as the optical switch 50. Optical switches having other structures may be used.

Third Embodiment

Figure 9:
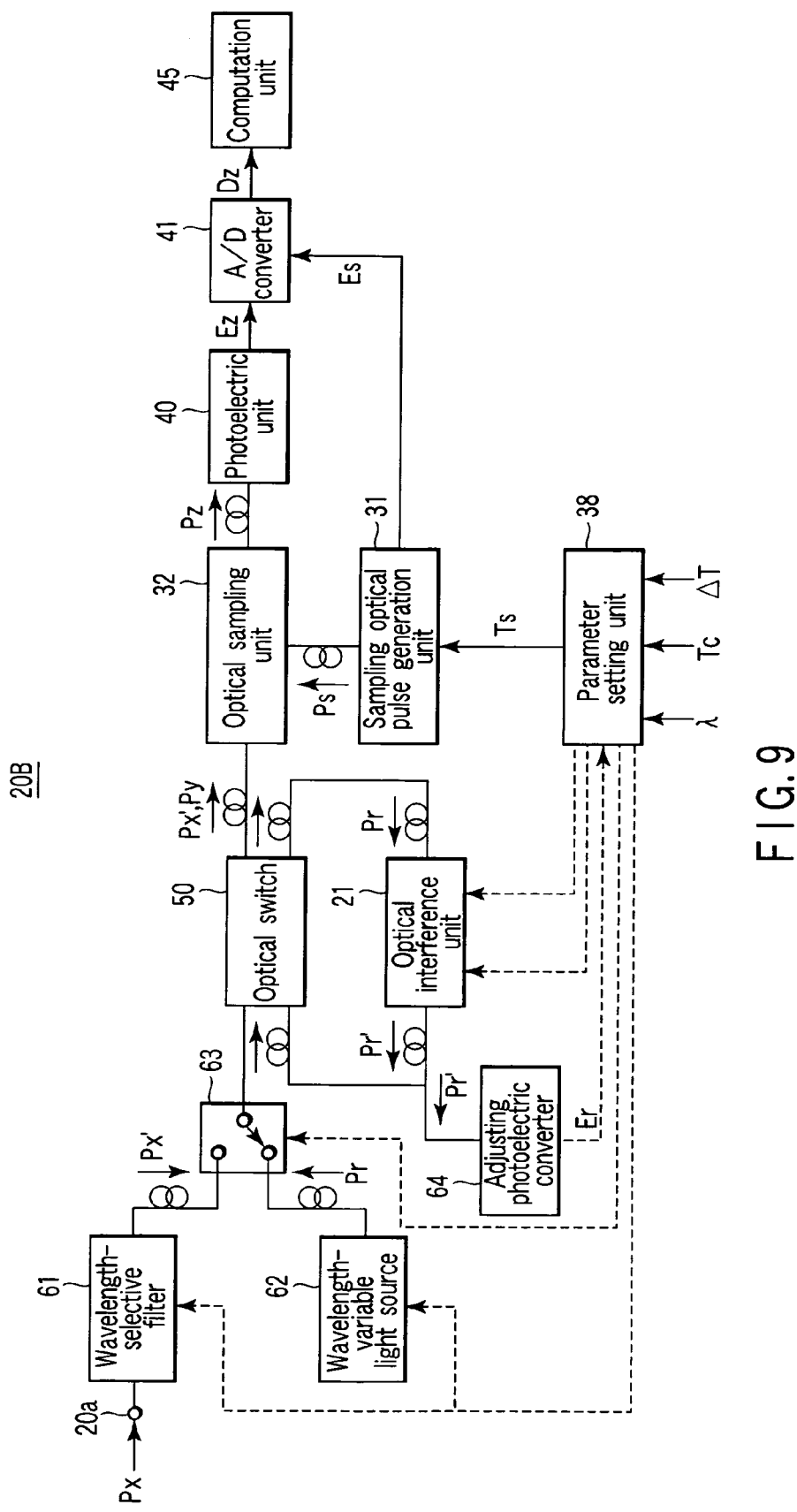
FIG. 9 is a block diagram for explaining a configuration of optical signal monitoring apparatus and method according to a third embodiment of the invention.

FIG. 9 is a block diagram showing a configuration of optical signal monitoring apparatus and method according to a third embodiment of the invention.

In FIG. 9, the same components as those the first and second embodiments of FIGS. 1 and 8 are designated by the same reference numerals, and the description thereof is omitted.

In an optical signal monitoring apparatus 20B of the third embodiment shown in FIG. 9, a second optical switch 63 is provided between the incident terminal 20a and the optical switch 50, and an adjusting photoelectric converter 64 is provided at an output end of the optical interference unit 21.

One end of the second optical switch 63 is connected to a wavelength-selective filter 61, and another end of the second optical switch 63 is connected to a wavelength-variable light source 62.

At this point, the parameter setting unit 38 sets information on a selective wavelength of the wavelength-selective filter 61 and information on a variable wavelength of the wavelength-variable light source 62.

The parameter setting unit 38 can perform processing of the electric signal Er from the adjusting photoelectric converter 64.

That is, the optical signal monitoring apparatus 20B of the third embodiment further includes the wavelength-variable light source 62 which emits wavelength-variable light Pr; the optical switch 63 which inputs the wavelength-variable light Pr into the optical interference unit 21 instead of the monitoring object optical signal Px phase-modulated at the predetermined symbol rate, the wavelength-variable light Pr being supplied from the wavelength-variable light source 62; and the adjusting photoelectric converter 64 which receives outgoing light Pr' supplied from the optical interference unit 21 while the optical switch 63 inputs the wavelength-variable light Pr into the optical interference unit 21. The optical signal monitoring apparatus 20B of the third embodiment is characterized in that light having a wavelength identical to a wavelength of the monitoring object optical signal Px is input into the optical interference unit 21 from the wavelength-variable light source 62 through the optical switch 63, the monitoring object optical signal Px being phase-modulated at the predetermined symbol rate, and the optical phase adjuster 24 of the optical interference unit 21 can be adjusted such that a level of an output signal from the adjusting photoelectric converter 64 becomes a predetermined value.

That is, in the optical signal monitoring apparatus 20B of the third embodiment, in order to selectively monitor the optical signals having the different wavelengths, the non-modulated light Pr is input from the wavelength-variable light source 62 into the optical interference unit 21 through the optical switch 63 instead of the optical signal Px, the output light Pr' is input into the adjusting photoelectric converter 64, and the output signal Er of the output light Pr' can be monitored.

That is, because an operation of the optical interference unit 21 depends on the optical wavelength, even if the multiplexing can be performed in identical phase or reverse phase to an optical signal having a certain wavelength, the phase relationship does not hold for an optical signal having another wavelength, and the modulation transform is not correctly performed.

Accordingly, when one of the plural optical signals having the different wavelengths is selectively monitored, in the state in which the non-modulated light Pr having the wavelength equal to the wavelength of the monitoring object optical signal Px is input into the optical interference unit 21, the level of the output signal Er of the adjusting photoelectric converter 64 is measured while the optical phase adjuster 24 is adjusted, and the optical phase adjuster 24 is set such that the phase difference between the multiplexed optical signals becomes identical phase or reverse phase. Therefore, the monitoring object optical signal Px is input after the modulation transform is correctly performed to the light having the wavelength.

The optical signal monitoring apparatus 20B of the third embodiment is also characterized by further including a wavelength-selective filter 61 which selectively inputs the optical signal Px' having the desired wavelength from the monitoring object optical signal Px phase-modulated at the predetermined symbol rate.

That is, in the case where the optical signals having the different wavelengths are selectively set to the monitoring object, as shown in FIG. 9, only the optical signal having the desired wavelength is selectively input using the wavelength-selective filter 61 which can change the wavelength of light transmitted therethrough.

In the case of this example, in addition to the technique of manually setting each unit associated with the wavelength, the wavelength λ is specified in the parameter setting unit 38, and the states of the optical phase adjuster 24 and wavelength-selective filter 61 may be set according to the specified wavelength λ.

An operation of the optical interference unit 21 will be described below with reference to equations.

Assuming that Ea and Eb are electric field vectors of two light multiplexed by the optical multiplexer 25 and Pa and Pb are light intensity, the following equations are obtained:

$$Ea = Aa \cdot \exp j(\omega t + \phi a)$$

$$Eb = Ab \cdot \exp j(\omega t + \phi b)$$

$$Pa = |Ea \cdot Ea^*|$$

$$Pb = |Eb \cdot Eb^*|$$

Where Ea* and Eb* are conjugate complex numbers of Ea and Eb, respectively.

When the two light are multiplexed, intensity P is given as follows:

$$P = (Ea + Eb)(Ea^* + Eb^*)$$

When the equation of the intensity P is expanded to use substitution of $\exp j(x) = \cos(x) + j \sin(x)$, the intensity P is expressed as follows:

$$P = Aa^2 + Ab^2 + 2Aa \cdot Ab \cdot \cos(\phi a - \phi b) \quad (1)$$

Figure 10:
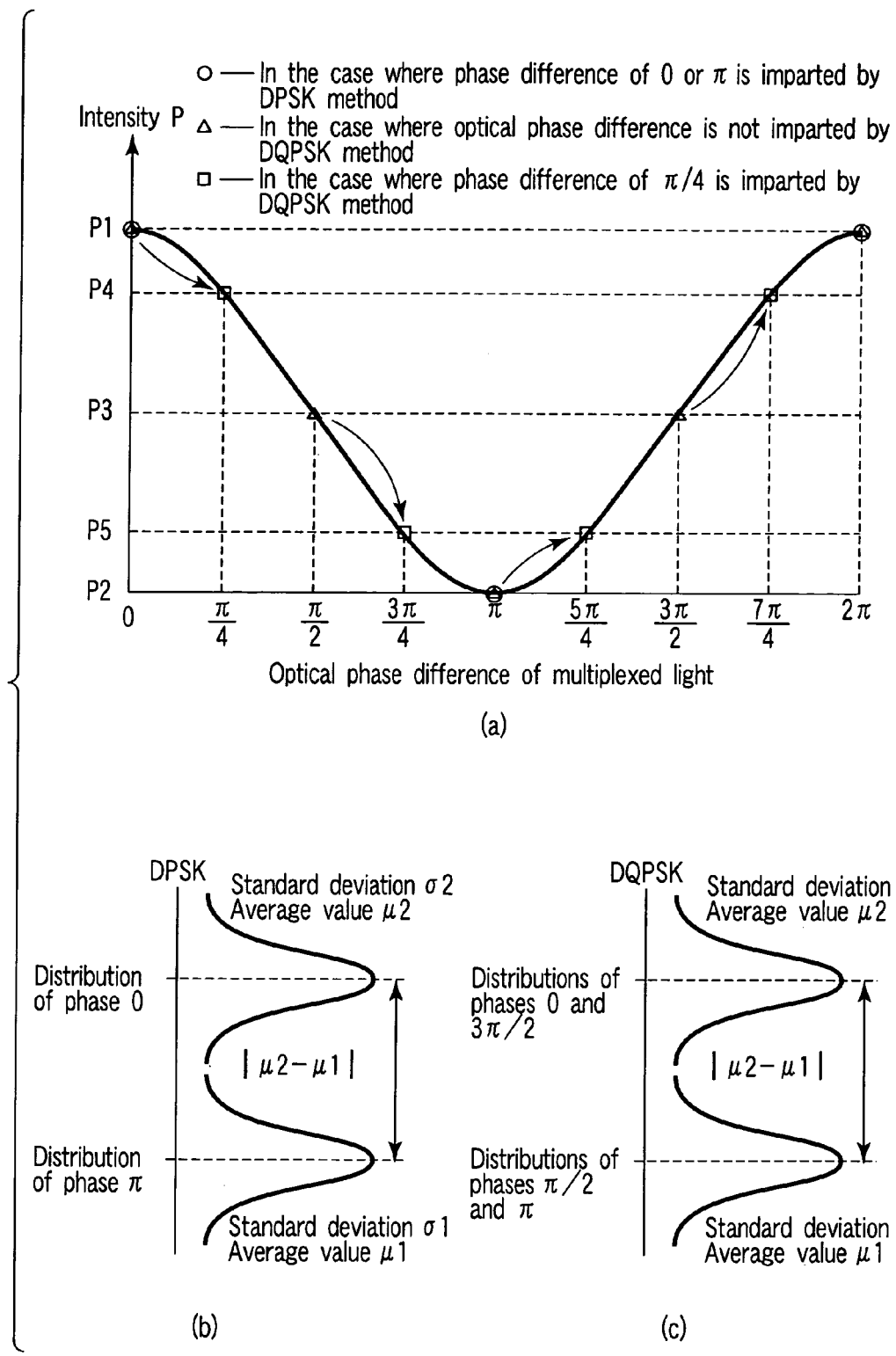
FIG. 10 is a waveform chart for explaining an operation of a main part of FIGS. 1, 8, and 9.
Figure 11:
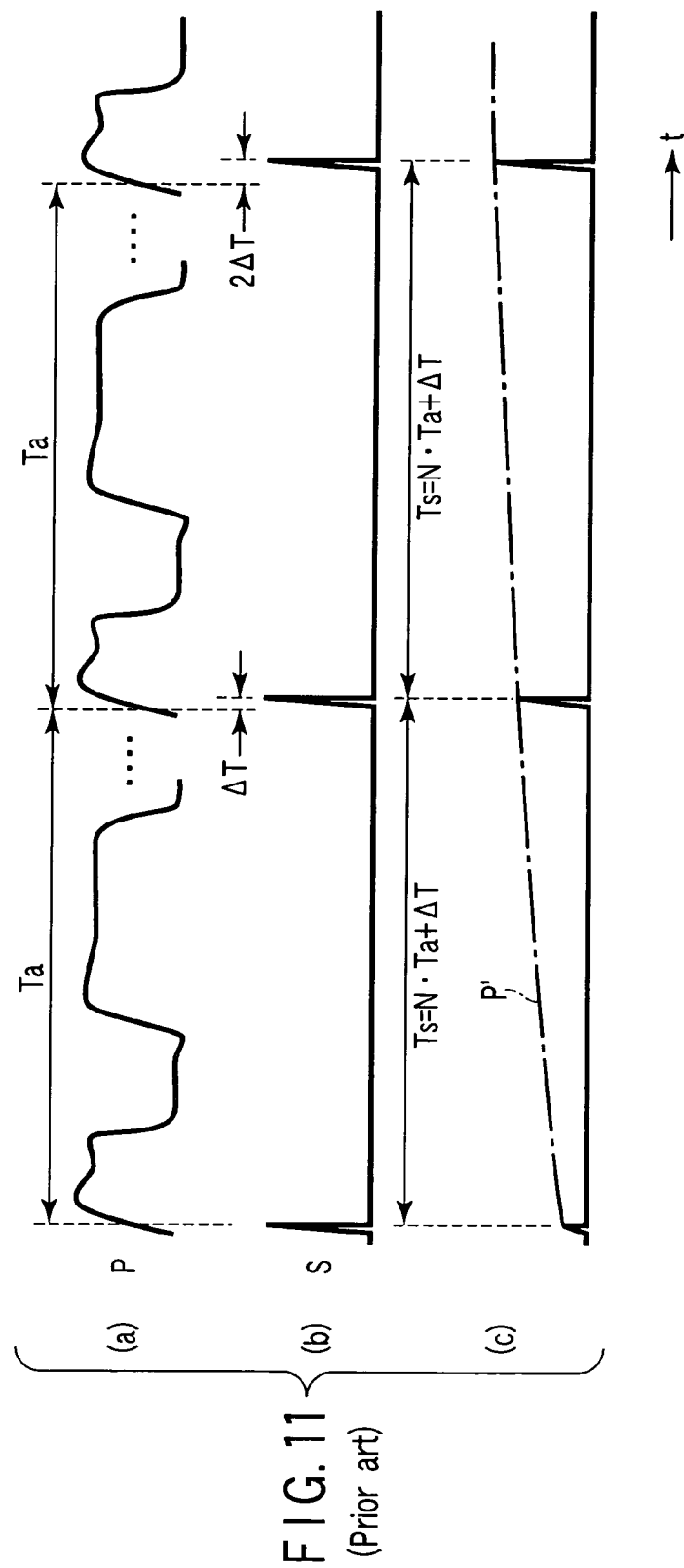
FIG. 11 is a waveform chart for explaining an equivalent time sampling method adopted in a conventional optical signal quality monitoring apparatus.

From the equation (1), as shows in (a) of FIG. 10, the intensity P is changed according to a cosine value of the phase difference between the multiplexed optical signals. The intensity P becomes the maximum value P1 in the case where the two multiplexed optical signals are in the identical phase ($\phi a - \phi b = 2n\pi$), and the intensity P becomes the minimum value P2 in the case where the multiplexed optical signals are in the reverse phase ($\phi a - \phi b = (2n+1)\pi$) ($n = 0, \pm 1, \pm 2, \ldots$).

In the case of the DPSK method, since the input optical signal has the phase of 0 or π, the optical phase difference between the optical signal delayed by one symbol and the original optical signal is adjusted into 0 or π as shown by a mark "○" in (a) of FIG. 10, thereby obtaining the optical signal Py whose intensity is changed according to two phases of 0 and π. Therefore, as shown in (b) of FIG. 10, the distributions corresponding to the phases 0 or π are obtained from the pieces of information on the amplitudes of the waveforms corresponding to the pieces of intensity P1 and P2, so that the quality value Q can be obtained.

In the case of the DQPSK method in which the two-bit data can be transferred per one symbol, four kinds of symbol phases 0, π/2, π, and 3π/2 are obtained for transition states of four kinds of two-bit data "00", "01", "10", and "11", and the four kinds of optical phase differences 0, π/2, π, and 3π/2 between the optical signal delayed by one symbol and the original optical signal are also obtained as shown by a mark "Δ" in (a) of FIG. 10. Therefore, three kinds of intensity P1, P2, and P3 are obtained when the multiplexing is directly performed.

Therefore, for the DQPSK method, while the delay amount of the delay device 23 is matched with the symbol clock period Tc of the optical signal phase-modulated by the DQPSK method, the optical phase of the optical signal Pxa' delayed by one symbol is shifted by $\pi/4$ using the optical phase adjuster 24, and the adjustment is made such that the optical phase difference between the optical signals Pxa" and Pxb multiplexed by the optical multiplexer 25 becomes odd-numbered multiplication of $\pi/4$ (one of $\pi/4$, $3\pi/4$, $5\pi/4$, and $7\pi/4$).

Consequently, the phase difference between the two multiplexed optical signals becomes the four kinds $\pi/4$, $3\pi/4$, $5\pi/4$, $7\pi/4$ as shown by a mark "□" in (a) of FIG. 10, and the intensity of the optical signal can be limited to the two kinds P4 and P5 after the multiplexing.

Thus, the delay corresponding to the optical phase of $\pi/4$ is added to one of the optical signal delayed by one symbol and the original optical signal, which limits the intensity of the optical signal to the two kinds after the multiplexing. As shown in (c) of FIG. 10, two distributions are obtained for a set of phases (0 and $3\pi/2$) of the original optical signal and a set of phases ($\pi/2$ and $\pi$) from the amplitude information corresponding to the two kinds of intensity, so that the quality can be monitored by the waveform observation while the quality value Q can be obtained.

Accordingly, as described above in detail, the invention can provide the optical signal monitoring apparatus and method in which the modulation state of the phase-modulated optical signal can be monitored.

The invention claimed is:

1. An optical signal monitoring apparatus comprising:
an optical interference unit which includes:
an optical brancher which branches a monitoring object optical signal into two optical paths, the monitoring object optical signal being input to be monitored and being phase-modulated at a predetermined symbol rate;
a delay device which imparts delay corresponding to an integral multiple of one symbol to an optical signal, the optical signal being branched in one optical path of the two optical paths by the optical brancher;
an optical phase adjuster which makes an adjustment such that an optical signal emitted from the delay device and an optical signal are brought into a predetermined optical phase difference, the optical signal being branched in another optical path of the two optical paths by the optical brancher; and
an optical multiplexer which multiplexes optical signals, the optical signals being adjusted so as to be brought into the predetermined optical phase difference by the optical phase adjuster,
wherein the optical interference unit converting the phase modulated monitoring object optical signal into intensity-modulated light to supply the intensity-modulated light, the monitoring object optical signal being supplied from the optical multiplexer;
a sampling optical pulse generation unit which produces a sampling optical pulse having a period Ts different from a predetermined offset time $\Delta T$ to integral multiplication N of a symbol clock period corresponding to the predetermined symbol rate;
an optical sampling unit which samples the intensity-modulated light using the sampling optical pulse to supply an optical pulse signal, the intensity-modulated light being emitted from the optical interference unit, the sampling optical pulse being produced by the sampling optical pulse generation unit;
a photoelectric converter which receives the optical pulse signal emitted from the optical sampling unit, and converts the optical pulse signal into an electric signal to supply the electric signal; and
a computation unit which computes a value indicating quality of the monitoring object optical signal based on the electric signal supplied from the photoelectric converter, the monitoring object optical signal being phase-modulated at the predetermined symbol rate.

2. The optical signal monitoring apparatus according to claim 1,
further including an optical switch capable of feeding an intensity-modulated monitoring object optical signal into the optical sampling unit while the optical interference unit is not interposed therebetween, the intensity-modulated monitoring object optical signal being fed to be monitored instead of the monitoring object optical signal phase-modulated at the predetermined symbol rate.

3. The optical signal monitoring apparatus according to claim 1,
further including:
a wavelength-variable light source which emits wavelength-variable light;
an optical switch which inputs the wavelength-variable light into the optical interference unit instead of the monitoring object optical signal phase-modulated at the predetermined symbol rate, the wavelength-variable light being emitted by the wavelength-variable light source; and
an adjusting photoelectric converter which receives outgoing light emitted from the optical interference unit while the optical switch inputs the wavelength-variable light into the optical interference unit,
wherein light having a wavelength identical to a wavelength of the monitoring object optical signal is input into the optical interference unit from the wavelength-variable light source through the optical switch, the monitoring object optical signal being phase-modulated at the predetermined symbol rate, and the optical phase adjuster of the optical interference unit is adjustable such that a level of an output signal from the adjusting photoelectric converter becomes a predetermined value.

4. The optical signal monitoring apparatus according to claim 1,
further including a wavelength-selective filter which selectively inputs an optical signal having a desired wavelength from the monitoring object optical signal phase-modulated at the predetermined symbol rate.

5. The optical signal monitoring apparatus according to claim 1,
wherein the delay device of the optical interference unit is configured to change a delay time according to a symbol rate of the monitoring object optical signal phase-modulated at the predetermined symbol rate.

6. The optical signal monitoring apparatus according to claim 1,
wherein the optical phase adjuster of the optical interference unit is adjusted with respect to a monitoring object optical signal such that an optical phase difference between two optical signals multiplexed by the optical multiplexer becomes 0 or $\pi$, the monitoring object optical signal being phase-modulated by a Differential Phase-Shift Keying (DPSK) method as the monitoring object optical signal phase-modulated at the predetermined symbol rate.

7. The optical signal monitoring apparatus according to claim 1,
wherein the optical phase adjuster of the optical interference unit is adjusted with respect to a monitoring object optical signal such that an optical phase difference between two optical signals multiplexed by the optical multiplexer becomes odd-numbered multiplication of π/4, the monitoring object optical signal being phase-modulated by a Differential Quadrature Phase-Shift Keying (DQPSK) method as the monitoring object optical signal phase-modulated at the predetermined symbol rate.

8. The optical signal monitoring apparatus according to claim 1,
wherein the sampling optical pulse generation unit includes:
a reference signal generator having a synthesizer configuration in which a stable signal is produced, the stable signal having a period Ts corresponding to a period of the sampling optical pulse;
a multiplier which supplies the stable signal as a signal multiplied by a factor of M (M is more than one), the stable signal being produced by the reference signal generator and having the period Ts;
a light source which emits continuous light;
an optical modulator which modulates the continuous light emitted from the light source by the signal multiplied by the factor of M supplied from the multiplier, thereby emitting an optical pulse having a period Ts/M;
an optical gating circuit which thins out the optical pulse emitted from the optical modulator into 1/M, and converts the optical pulse into an optical pulse having the period Ts; and
a dispersion-decreasing fiber which narrows a pulse width of the optical pulse having the period Ts and converted by the optical gating circuit, and supplies the optical pulse as the sampling optical pulse.

9. The optical signal monitoring apparatus according to claim 1,
wherein the optical sampling unit includes:
an electroabsorption optical modulator which has two optical terminals and a power supply terminal, the two optical terminals being used to input and output light, the power supply terminal imparting an electric field to an optical path connecting the two optical terminals, the electroabsorption optical modulator having a characteristic in which an absorption index is changed with respect to the light propagating through the optical path according to a level of the electric field, the electroabsorption optical modulator receiving the monitoring object optical signal at one of the two optical terminals;
a direct-current power supply which applies a predetermined direct-current voltage to the power supply terminal of the electroabsorption optical modulator, the electroabsorption optical modulator exhibiting a high absorption index with respect to the monitoring object optical signal at the predetermined direct-current voltage; and
a photocoupler which receives the sampling optical pulse emitted from the sampling optical pulse generation unit to input the sampling optical pulse into another of the two optical terminals of the electroabsorption optical modulator, and receives the monitoring object optical signal to input the monitoring object optical signal in as the optical pulse signal into the photoelectric converter, the monitoring object optical signal being output from the other of the two optical terminals of the electroabsorption optical modulator,
wherein when the sampling optical pulse is supplied, the absorption index is lowered by a mutual absorption saturation characteristic of the electroabsorption optical modulator, and the monitoring object optical signal is passed onto a side of the other of the two optical terminals of the electroabsorption optical modulator to perform sampling.

10. The optical signal monitoring apparatus according to claim 9,
wherein, in order to prevent leakage of the sampling optical pulse to a transmission path of the monitoring object optical signal, the sampling optical pulse being input into the other of the two optical terminals of the electroabsorption optical modulator, the optical sampling unit further includes:
a second photocoupler which is inserted into the one of the two optical terminals of the electroabsorption optical modulator; and
an optical terminator which terminates the sampling optical pulse through the second photocoupler.

11. The optical signal monitoring apparatus according to claim 1,
further including a parameter setting unit which receives information on a symbol clock period Tc corresponding to the predetermined symbol rate modulating the monitoring object optical signal or information on a bit rate of the data signal and information on the predetermined offset time to obtain a sampling period Ts of the sampling optical pulse from computation of $$Ts = N \cdot Tc + \Delta T$$

(where a value of N is determined by the symbol clock period Tc of the data signal and a frequency variable range of a signal which can be supplied from the sampling optical pulse generation unit),
the parameter setting unit setting the sampling period Ts of the sampling optical pulse in the sampling optical pulse generation unit.

12. The optical signal monitoring apparatus according to claim 1,
further including a analog/digital (A/D) converter which is inserted between the photoelectric converter and the computation unit, converts the electric signal from the photoelectric converter into a digital value by sampling the electric signal with a sampling clock synchronized with the sampling optical pulse, and supplies the digital value as a data signal to the computation unit.

13. The optical signal monitoring apparatus according to claim 12,
wherein the sampling clock is output while the sampling optical pulse generation unit synchronizes the sampling clock with the sampling optical pulse.

14. The optical signal monitoring apparatus according to claim 13,
wherein the computation unit compares the data signals from the A/D converter with a predetermined threshold value to classify the data signals into a sample value belonging to data "1" and a sample value belonging to data "0", obtains an average value and a standard deviation of a group of sample values for each of the data "1" and the data "0", and obtains a ratio μ/γ of a difference μ between the average values of the data "1" and the data "0" and a sum γ of the standard deviations as a quality value Q.

15. An optical signal monitoring method comprising:
a step of preparing an optical interference unit including:
an optical brancher which branches a monitoring object optical signal into two optical paths, the monitoring object optical signal being input to be monitored and being phase-modulated at a predetermined symbol rate;
a delay device which imparts delay corresponding to an integral multiple of one symbol to an optical signal, the optical signal being branched in one optical path of the two optical paths by the optical brancher; an optical phase adjuster which makes an adjustment such that outgoing light of the delay device and an optical signal are brought into a predetermined optical phase difference, the optical signal being branched in another optical path of the two optical paths by the optical brancher; and an optical multiplexer which multiplexes the optical signals, the optical signals being adjusted so as to be brought into the predetermined optical phase difference by the optical phase adjuster, the optical interference unit converting the phase-modulated monitoring object optical signal into intensity-modulated light to supply the intensity-modulated light, the monitoring object optical signal being supplied from the optical multiplexer;
a sampling optical pulse generation step of producing a sampling optical pulse having a period Ts different from a predetermined offset time ΔT to integral multiplication of a symbol clock period corresponding to the predetermined symbol rate;
an optical sampling step of sampling the intensity-modulated light using the sampling optical pulse to supply an optical pulse signal, the intensity-modulated light being emitted from the optical interference unit, the sampling optical pulse being produced by the sampling optical pulse generation unit;
a photoelectric conversion step of receiving the optical pulse signal emitted from the optical sampling step, and converting the optical pulse signal into an electric signal to supply the electric signal; and
a computation step of computing a value indicating quality of the monitoring object optical signal based on the electric signal supplied from the photoelectric conversion step, the monitoring object optical signal being phase-modulated at the predetermined symbol rate.

16. The optical signal monitoring method according to claim 15,
further including a step of preparing an optical switch capable of inputting an intensity-modulated monitoring object optical signal into the optical sampling step while the optical interference unit is not interposed therebetween, the intensity-modulated monitoring object optical signal being input to be monitored instead of the monitoring object optical signal phase-modulated at the predetermined symbol rate.

17. The optical signal monitoring method according to claim 15,
further including:
a step of preparing a wavelength-variable light source which emits wavelength-variable light;
a step of preparing an optical switch which inputs the wavelength-variable light into the optical interference unit instead of the monitoring object optical signal phase-modulated at the predetermined symbol rate, the wavelength-variable light being emitted from the wavelength-variable light source; and
a step of preparing an adjusting photoelectric converter which receives outgoing light emitted from the optical interference unit while the optical switch inputs the wavelength-variable light into the optical interference unit,
wherein light having a wavelength identical to a wavelength of the monitoring object optical signal is input into the optical interference unit from the wavelength-variable light source through the optical switch, the monitoring object optical signal being phase-modulated at the predetermined symbol rate, and the optical phase adjuster of the optical interference unit is adjustable such that a level of an output signal from the adjusting photoelectric converter becomes a predetermined value.

18. The optical signal monitoring method according to claim 15,
further including a step of preparing a wavelength-selective filter which selectively inputs an optical signal having a desired wavelength from the monitoring object optical signal phase-modulated at the predetermined symbol rate.

19. The optical signal monitoring method according to claim 15,
wherein the delay device of the optical interference unit is configured to change a delay time according to a symbol rate of the monitoring object optical signal phase-modulated at the predetermined symbol rate.

20. The optical signal monitoring method according to claim 15,
wherein the optical phase adjuster of the optical interference unit is adjusted with respect to a monitoring object optical signal such that an optical phase difference between two optical signals multiplexed by the optical multiplexer becomes 0 or π, the monitoring object optical signal being phase-modulated by a Differential Phase-Shift Keying (DPSK) method as the monitoring object optical signal phase-modulated at the predetermined symbol rate.

21. The optical signal monitoring method according to claim 15,
wherein the optical phase adjuster of the optical interference unit is adjusted with respect to a monitoring object optical signal such that an optical phase difference between two optical signals multiplexed by the optical multiplexer becomes odd-numbered multiplication of π/4, the monitoring object optical signal being phase-modulated by a Differential Quadrature Phase-Shift Keying (DQPSK) method as the monitoring object optical signal phase-modulated at the predetermined symbol rate.

* * * * *